United States Patent [19]
Ange

[11] Patent Number: 6,121,963
[45] Date of Patent: Sep. 19, 2000

[54] VIRTUAL THEATER

[75] Inventor: Christopher John Ange, Cedar Hill, Tex.

[73] Assignee: VRMetropolis.com, Inc.

[21] Appl. No.: 09/491,952

[22] Filed: Jan. 26, 2000

[51] Int. Cl.[7] ............................. H04N 9/475; G06F 17/30
[52] U.S. Cl. ............................................ 345/302; 707/526
[58] Field of Search ...................................... 345/302, 418, 345/425, 427–439, 470, 475, 112, 113–116, 118–121, 127, 149, 326, 334, 342, 214; 707/500–501, 505–509, 511–512, 513–517, 526, 522–523, 520–521, 530; 709/200, 201–203

[56] References Cited

U.S. PATENT DOCUMENTS

| | | | |
|---|---|---|---|
| 5,619,424 | 4/1997 | Cookson et al. | 364/514 |
| 5,623,587 | 4/1997 | Bulman | 345/435 |
| 5,904,484 | 5/1999 | Burns | 434/252 |
| 5,923,791 | 7/1999 | Hanna et al. | 382/295 |
| 6,034,677 | 3/2000 | Noguchi et al. | 345/327 |

OTHER PUBLICATIONS

Danny Goodman, JavaScript Bible, IDG Books, pp. 522–523, Oct. 1998.
Tyler et al., Microsoft Front Page 98, Sams.net, pp. 290–291 and 318–319, 1997.

*Primary Examiner*—Joseph H. Feild
*Assistant Examiner*—Alford W. Kindred
*Attorney, Agent, or Firm*—James J. Murphy, Esq.; Winstead Sechrest & Minick

[57] ABSTRACT

A system and method of presenting whole and/or segmented presentation files, such as graphics, multimedia and/or video files in any combination, within a combination of table or array formats to create a complete scene from within which such presentation files may be placed, played, downloaded, streamed or viewed, including multi-layer file embedding in JAVA which produces a complete scene within which presentation files may be placed, played, streamed or viewed, in a portable virtual one-page design with viewing capability over the World Wide Web via a Web browser or other graphical user interface, over the Internet via a Web browser or other graphical user interface, or from within word processing, desktop publishing, spreadsheet, database or other presentation applications.

1 Claim, 9 Drawing Sheets

VIRTUAL THEATER

CROSS-REFERENCE TO RELATED APPLICATIONS

This non-provisional application for patent is related to the provisional applications for patent entitled "VIRTUAL THEATER" filed Jan. 29, 1999 by the inventor ANGE, Christopher J. and granted U.S. Ser. No. 60/117,685, currently pending.

BACKGROUND OF THE INVENTION

1. Field of the Invention

The present invention relates, in general, to a system and a method, under the control of a computer, for the presentation of graphics, multimedia and video files integrated within a computer environment carried over the World Wide Web or the Internet and visualized on a screen using a graphic user interface (GUI). More specifically, this invention relates to a process, under the control of a computer, of embedding multiple tables within multiple table cells, in combination with pixel-accurate table and cell size attributes, to integrate graphics, multimedia and video files within a computer environment wherein such files can be played, downloaded, streamed or viewed as an integral part of such computer environment.

2. Description of Related Art

The World Wide Web (WWW) is a hypertext information and communication system used on the Internet, which is a global computer network, with data communications operating according to a client/server model using a Hypertext Transfer Protocol (HTTP). HTTP is a known communication protocol that provides users access to files using standard page description languages referred to as Hypertext Markup Language (HTML), Dynamic Hypertext Markup Language (DHTML), Extensible Markup Language (XML), or JAVA. Files that are accessed using HTML, DHTML, XML or JAVA may be provided in different formats, such as text, graphics, images, sound, and video, among others. WWW, or web, functionality within data processing typically has been through the use of web browsers that allow for simple graphic user interface-based access to network servers. Two commercially available web browsers are Netscape Communicator™ (NSC) and Internet Explorer™ (IE).

Currently, the web is viewed daily by millions of people and viewership of the web is expected to more than double in the next few years. Businesses are learning how to use the web to sell their products and to enhance their image to a computer literate clientele. An increasing number of businesses are spending large quantities of time and resources to produce their web pages as a means of enhancing their corporate image. Such businesses would like to incorporate audio and video presentations into their web pages in a manner that would link the audio and video presentations with their corporation and its products.

Typically businesses embed their multimedia/video or presentation files into an HTML web page as an image or an applet (using the <EMBED SRC> or <script language="JavaScript"> tags) by placing the image within the web page's <body> and </body> tags by itself or within a table cell. In addition, the presentation file may be text-wrapped by wrapping text either to the files' left or to its right in the page layout, either as a stand-alone image or as an image placed in a table cell. Currently text-wrapping a multimedia/video file represents the closest that a typical web page designer can get to incorporating such files into a web page layout. There is no option generally available for incorporating the multimedia/video file into another graphic file representing the web page's environment. Add to this that different browsers have different requirements that must be met to enable a viewer to play the multimedia/video files, thereby making compatibility across multiple viewing platforms and GUIs problematic.

Unfortunately, current technology does not allow multimedia/video files to be successfully incorporated into complete scenes and/or web page environments where they can be viewed as an integral part of that scene or environment. Thus, whenever a viewer wants to see a video or multimedia presentation file on the Internet, the viewer is presented with a separate "pop-up" window in which the video is played. This window normally contains the same type of button controls that are present on a VHS video player (i.e., play, stop, rewind, etc.) giving the viewer the option to re-play portions of the video, fast-forward past other portions and stop the video whenever the viewer feels like it. This "pop-up" window can be viewed after downloading the presentation file to a desktop computer or via a streaming media engine which means that the window is always implemented, or viewed, as a stand-alone object. Whether the video is broadcast live or post-produced, it resides in its own frame—the window—on its own page, as a stand-alone image or within a separate HTML table. See FIG. 1.

Because the typical "pop-up" window is separate from the page layout and is not an integral part of the scene or environment of the page layout, the entire viewing experience is limited and appears disconnected from the rest of the page layout. Unfortunately the state-of-the-art commercially available systems do not allow the use of multimedia presentations within web page designs, nor the embedding of multimedia presentations within graphics specifically designed around the multimedia presentation to create a desired web page environment. Thus, there is a need for businesses to be able to integrate multimedia/video presentations within the graphics of web page layouts in order that viewers will associate the multimedia/video presentation with the company and its products.

Furthermore, the "pop-up" window arrangement allows the viewer to control the viewing of the presentation. Often the companies who have spent the time and money to design the web page would prefer that they could control the presentation. For example, they may want the viewer to be required to view the entire presentation in the desired context. Thus, there is a need for multimedia/video presentations over the web where the viewing experience is controlled by the web designer.

In addition, the quality of the viewing experience of most multimedia/video presentations is dependent upon which browser, application, operating system or platform is being used by the viewer. Therefore, there is a need for multimedia/video presentations over the web that are independent of the viewer's browser, application, operating system or platform.

The need to include multimedia/video presentations within the overall computer environment is exemplified by web sites available to preview movies prior to either seeing the movie or purchasing the video. Current previewing sites, such as Blockbuster.com, allow viewers to select the movie they want to preview. Once a movie or video has been selected, a pop-up window will appear that contains trailer information. However, the viewer is denied a more realistic theater-like experience such as would be experienced if the viewer were to view the movie in a virtual theater. This situation has developed a need to create a full "theater-like" experience for the viewer in which the viewer can sit in a virtual theater to preview the selected movies.

SUMMARY OF THE INVENTION

The invention contemplated herein will meet the needs discussed above by providing a process, under the control of a computer, whereby multimedia/video or presentation files can be played, downloaded, streamed or viewed as an integral part of a computer environment sent over the World Wide Web or the Internet and visualized on a screen using a GUI.

The invention contemplates a system of embedding files into multiple tables within multiple table cells, in combination with pixel-accurate table and cell size attributes to match each embedded file's dimensions, to fully integrate presentation files within a computer environment, wherein such integration comprises the consistent alignment of the presentation file within the background of the computer environment regardless of the viewing platform or GUI used by the viewer.

In accordance with one aspect of the invention, a presentation file (such as a multimedia/video file) is integrated within a computer environment designed to accept the presentation file by a process comprising the steps of: designing a background; determining the dimensions and placement of the presentation file in the background; creating a template to the dimensions of the presentation file; copying and pasting the presentation template into a layer above the background and in the desired position of the presentation file; delineating the borders of the template with guides; cutting out of the background a section of the background corresponding to the superimposed template's size and dimensions; pasting the section into a new layer above the template; deleting the template; copying and saving the section to its own file; saving the background and the section to a scene-file, the background being on a bottom layer and the section on a layer above the background and superimposed over the desired location of the presentation file in the background; segmenting the background; saving each segment, including the empty segment corresponding to the section that was cut out, as a separate file; creating a table and subtable of such files as necessary; setting each table's and subtable's attributes to the exact dimensions of its respective segment file, the presentation file's dimensions being the same as that of the cut out section; and embedding each segment file and the presentation file in the designated table or subtable with pixel-accurate alignment.

In one implementation of the process, a Virtual Theater is created providing the viewer with a full "theater-like" experience. The viewer visualizes a theater with chairs and a screen where a curtain rises and the presentation is played. However, this Virtual Theater is only one example of the possible ways in which this invention can be implemented. The Virtual Theater's design, design methods, design processes and design motifs are not limited in application or scope to viewing motion pictures from movie house scenes. By considering all pertinent definitions of the word "theater", which includes "a place or sphere that is the scene of dramatic events or significant action", the possible uses and applications for the Virtual Theater, the Virtual Theater's design, design methods, design processes and design motifs are many.

The foregoing has outlined rather broadly several aspects of the present invention in order that the detailed description of the invention may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other systems and processes for carrying out the same purposes as the invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 3A–FIG. 3F illustrate various steps in the process for integrating a video/multimedia file into a computer environment;

FIG. 5A–FIG. 5H illustrate various scene segmentation profiles for which the HTML and DHTML source codes, as used in the Multi Table/Multi Cell embedding process, are set out in the description below.

DESCRIPTION OF THE PREFERRED EMBODIMENTS

The principles of the present invention and their advantages are best understood by referring to the illustrated embodiment depicted in FIGS. 1–5H of the drawings, in which like numbers designate like parts.

Figure 1:
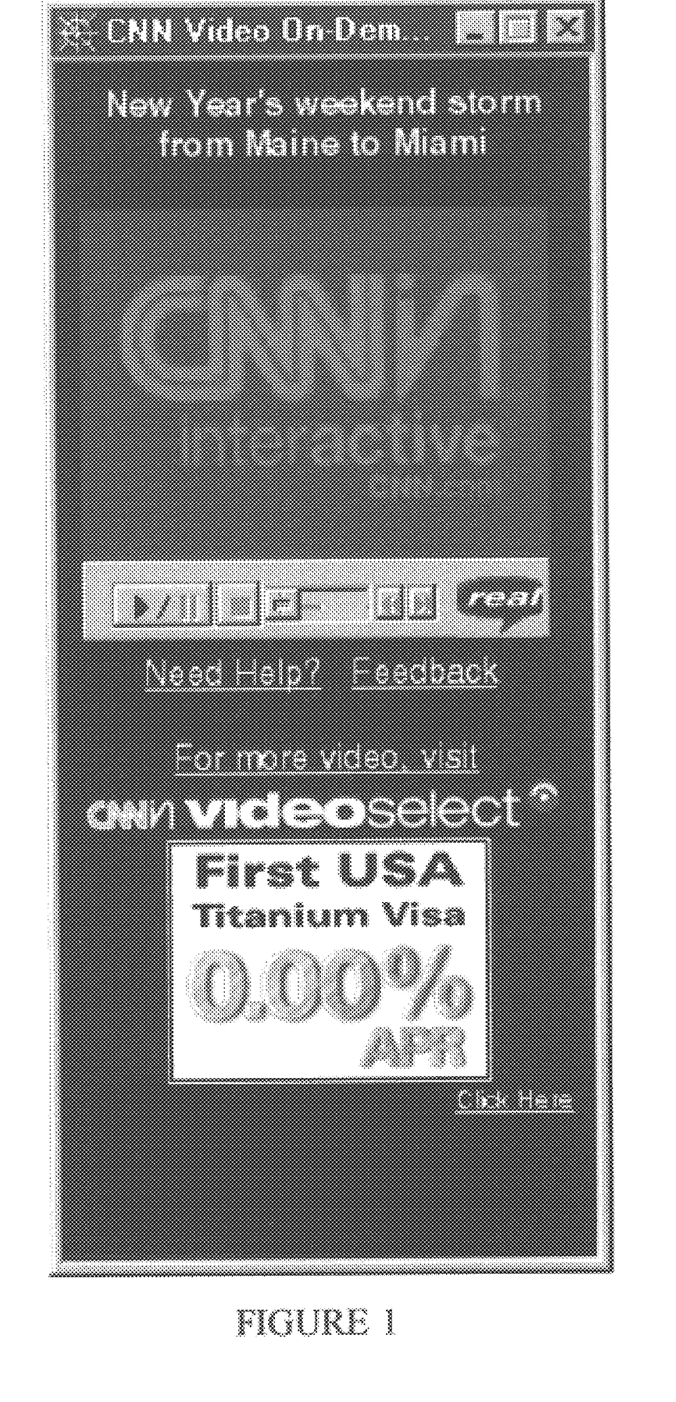
FIG. 1 illustrates the prior art in video/multimedia Internet display.

FIG. 1 is an illustrative embodiment of a method or process in accordance with the invention is described in some detail below as it might be implemented by a computer. In the interest of clarity, not all features of an actual implementation are described in this specification. It is noted that in the development of any such actual implementation numerous programming decisions must be made to achieve the developer's specific goals, which will vary from one implementation to another.

Figure 2:
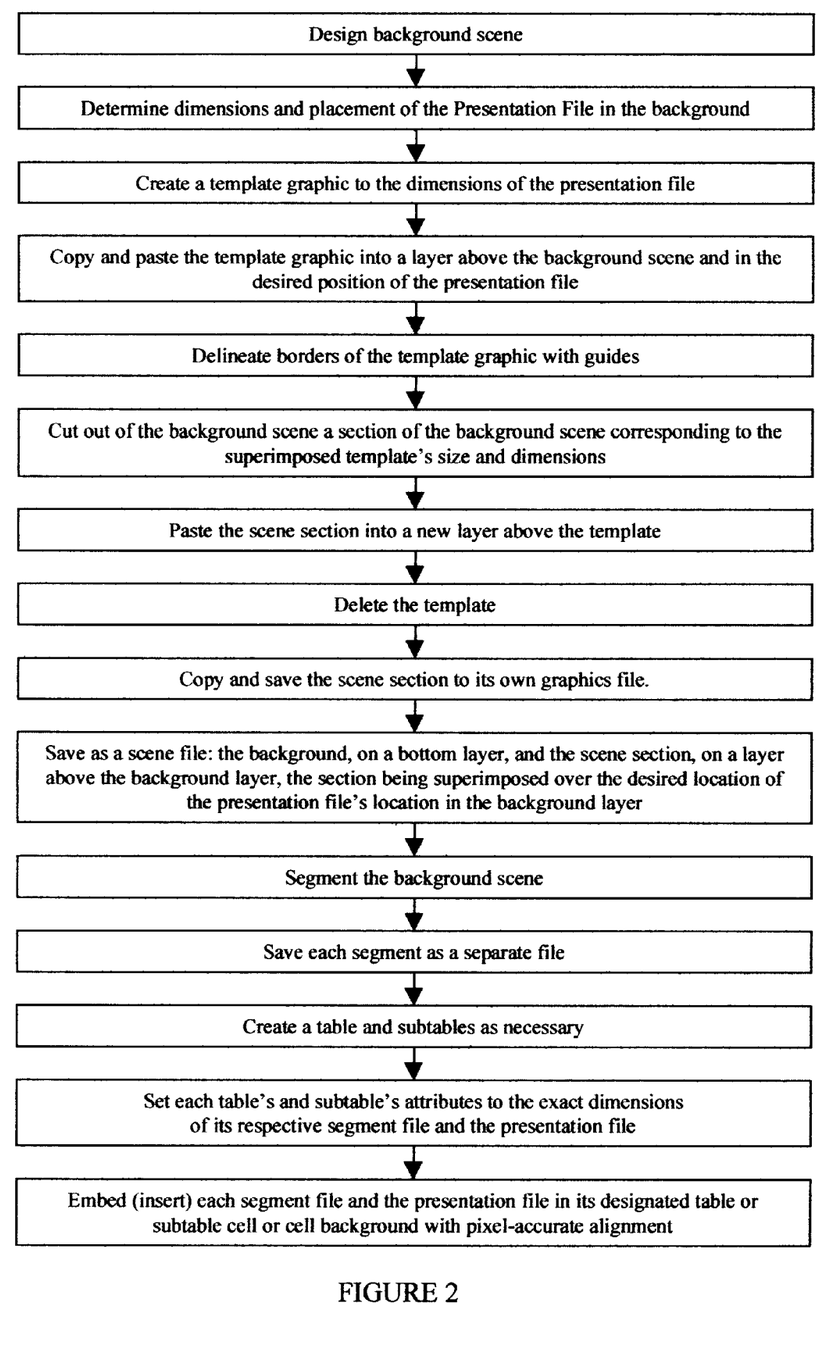
FIG. 2 represents a flow diagram of the process for integrating a video/multimedia file into a computer environment.

Referring to FIG. 2, a process is shown whereby a presentation file can be fully integrated within the computer environment. The process allows a presentation file to be embedded within a scene, layered on top of a scene, or ported through a scene. The process comprises the steps of: designing a background; determining the dimensions and placement of the presentation file in the background; creating a template to the dimensions of the presentation file; copying and pasting the presentation file template into a layer above the background and in the desired position of the presentation file; delineating the borders of the template with guides; cutting out of the background a section of the background corresponding to the superimposed template's size and dimensions; pasting the section into a new layer above the template; deleting the template; copying and saving the section to its own file; saving the background and the section to a scene-file, the background being on a bottom layer and the section on a layer above the background and superimposed over the desired location of the presentation file in the background; segmenting the background; saving each segment, including the empty segment corresponding to the section that was cut out, as a separate file; creating a table and subtable of such files as necessary; setting each table's and subtable's attributes to the exact dimensions of its respective segment file, the presentation file's dimensions being the same as that of the cut out section; and embed each segment file and the presentation file in its designated table or subtable with pixel-accurate alignment.

One example of the process is the creation of a Virtual Theater to provide an Internet viewer of media or video presentations to experience a full "theater-like" experience. The development of the Virtual Theater requires two major parts: the presentation file and the actual theater design scene.

Although DHTML possesses the ability to layer presentation files over scenes, DHTML has problems achieving consistent layout coordinate accuracy versus browser design, browser revision, and the numerous possible end-user desktop monitor settings for display area and palette size, as well as near infinite variations in scaling a web browser's window size on the desktop. This translates into a presentation file embedded in an upper DHTML layer which will more often than not be out of alignment with the scene it is supposed to blend with when viewed in a web browser.

Furthermore, designing the Virtual Theater motif into the web page's background as a solid graphic and then embedding the presentation file into an HTML web page as an image or an applet (using the <EMBED SRC> or <script language="JavaScript"> tags), or into layer N of a DHTML web page, will also create misalignment between the presentation file and the scene or scenes. In addition, such background graphic must be a whole (single piece) design, which when tiled takes a long time to load. Plus, there would be no way to guarantee the accurate centering of the video file in the desired location of the virtual theater design. This is because of variations in end-user monitor display area and palette settings, as well as near infinite variations in scaling a web browser's window size on the desktop. In contrast to the process described below, previously known Internet web page development architectures, design methods or processes are incapable of allowing a presentation file to "punch through" a solid web page graphic, or reside in an upper layer as a fixed-position or streamable graphic on a HTML or DHTML web page without misalignment within a scene or scenes.

The creation of the Virtual Theater in an HTML environment requires two original design processes: (1) Segmented Graphics Design (SGD) and (2) HTML MultiTable Embedding (MTMC Embedding).

SGD is a design methodology whereby graphics, whether as complete works or as portions of complete works, are divided into segments for use as either: (a) layer templates for shaping or modifying others graphics, or (b) files that when recombined by the viewer in any computer system comprises an entire and seamless one-piece graphic.

MTMC Embedding is an architectural design process whereby HTML tables and/or table cells are embedded in, and precision fit to, other HTML tables and/or table cells which, when combined with precise segmented scene file placements, creates a seamless one-piece scene with the ability to embed any dimensionable computer presentation file seamlessly into a scene or scenes on a single HTML layer.

An example of MTMC Embedding arose from the creation of a home page scene having "poster design" artwork. The poster design entitled Indexart.psd was cropped into 11 sections and their file names changed to Indexart N.jpg. Each Indexart N.jpg graphics segment was placed in its own precisely dimensioned table cell within the page's precisely dimensioned main table, or was placed in its own precisely dimensioned table cell in a separate precisely-dimensioned sub-table which was then placed in a precisely dimensioned cell within the page's main table, to create a complete and seamless home page scene. This placing image files into their own precisely dimensioned table cells in a separate precisely-dimensioned sub-table, and then placing the sub-table into a precisely dimensioned cell within a main table is one example of MTMC Embedding process.

Scene Design

The Virtual Theater's scene design or background scene is created and the desired dimensions of the background scene and the presentation file are determined. The desired placement of the presentation file is also determined.

A preferred embodiment of the process uses a scene design that is 600 pixels wide (pw) by 350 to 400 pixels tall (ph). These dimensions will accommodate display area settings down to 640 pw×480 ph, which is how most computer monitors are configured at the factory. End users with monitor display area settings above 640 pw×480 ph will see a smaller scene, but without loss in scene segment or presentation file placement accuracy. This consistency in the alignment of the scene segments represents one advantage of the described process.

Figure 3:
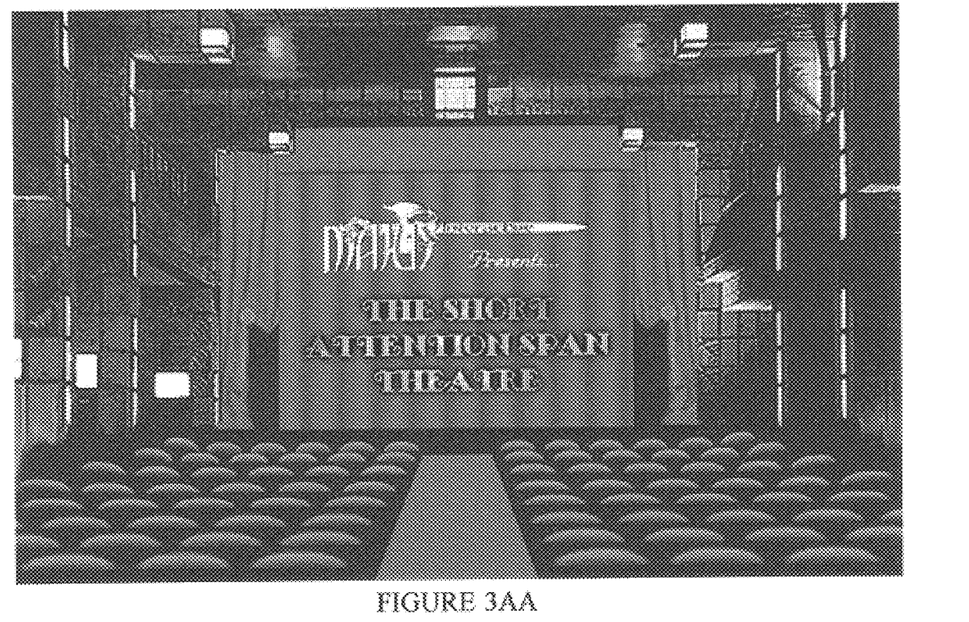
Figure 3A:
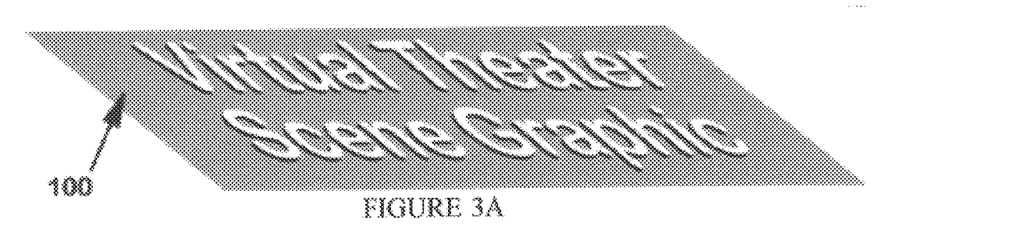

FIG. 3a illustrates the Virtual Theater scene graphic 100, a specific embodiment of which is illustrated in FIG. 3aa. A preferred embodiment will create the scene graphic using Adobe Systems Incorporated's PhotoShop 4.0. The scene graphic used in the Virtual Theater had a theater stage design at its center, seats in front (placed so as to simulate a theater-goer's stage view from a center theater seat), floor-to-ceiling curtains surrounding the stage, and a stage curtain.

Un-flattened, the Virtual Theater scene consisted of 24 separate layers in PhotoShop, with the stage curtains intentionally occupying a separate layer. The Virtual Theater not only played a video from a normal theater's location at center stage, but it also had the curtains draw open at the video's beginning and then draw shut after the video had finished playing.

The opening and closing of the curtains required that the stage curtain's opening be incorporated at the beginning of the video and the stage curtains' closing be incorporated at the end of the video. In order, to ensure that the curtains would fill the video's frame dimensions, the exact size of the video's "window" was determined.

Segmenting the Virtual Theater Scene's Curtain

The presentation file was a 30-second video consisting of a royalty-free on-board sailing video downloaded off the web as a Microsoft video for Windows.AVI file, and was post-produced using a Matrox Rainbow Runner video editing card and Ulead Systems' MediaStudio Pro 5.0 Non-Linear Editor (NLE) software.

A JAVA-based streaming video product from GEO Interactive, called EmblazeVideo 1.0, was selected for the video screening because it didn't require a browser plug-in to view the video. Although the video input/output frame size capabilities of Emblaze Video 1.0 were limited, the largest of its three possible default frame sizes (240 pixels wide by 176 pixels high) was selected as the video window size.

Figure 3B:
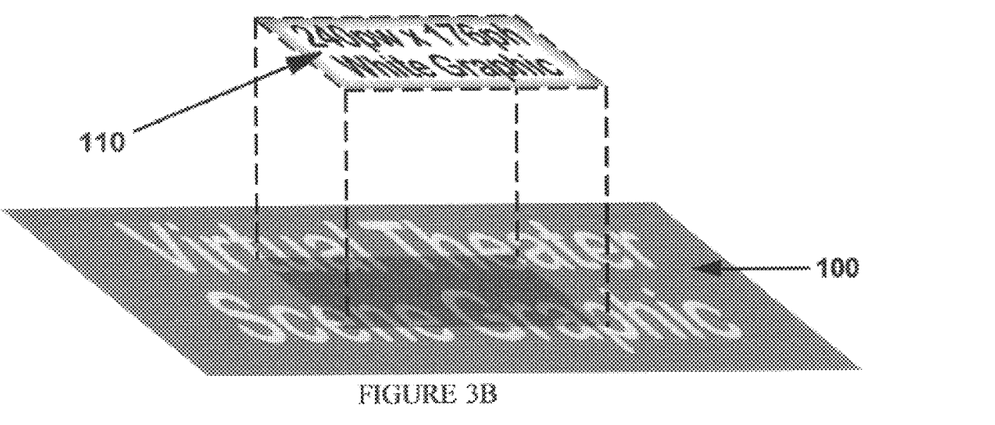

A new 240 pw×176 ph white rectangle graphic 110 was created in a separate file as a template for extracting a curtain segment of the Virtual Theater Scene having the dimensions of the video window size. This template was copied and pasted into the Virtual Theater scene 100 in PhotoShop as Layer 2, above the Virtual Theater Scene's Layer 1, and placed in the desired center stage location 110 as seen in FIG. 3b.

Figure 3C:
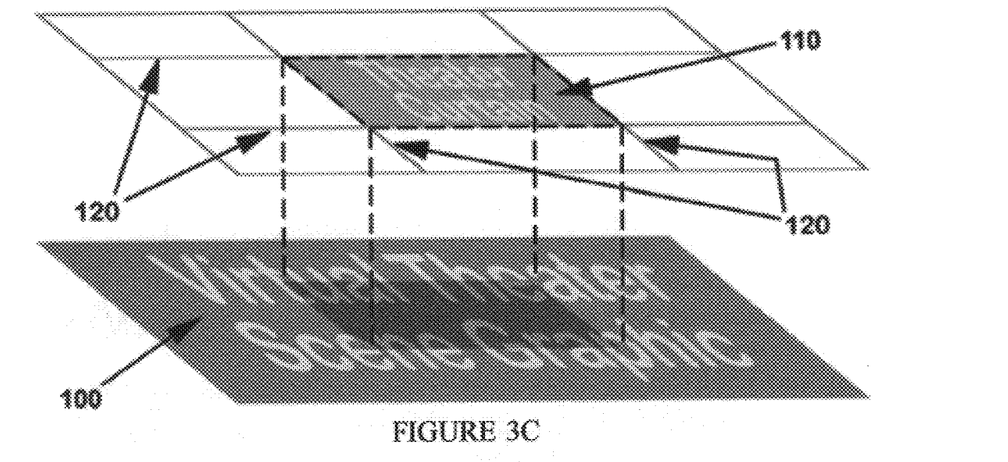
Figure 3D:
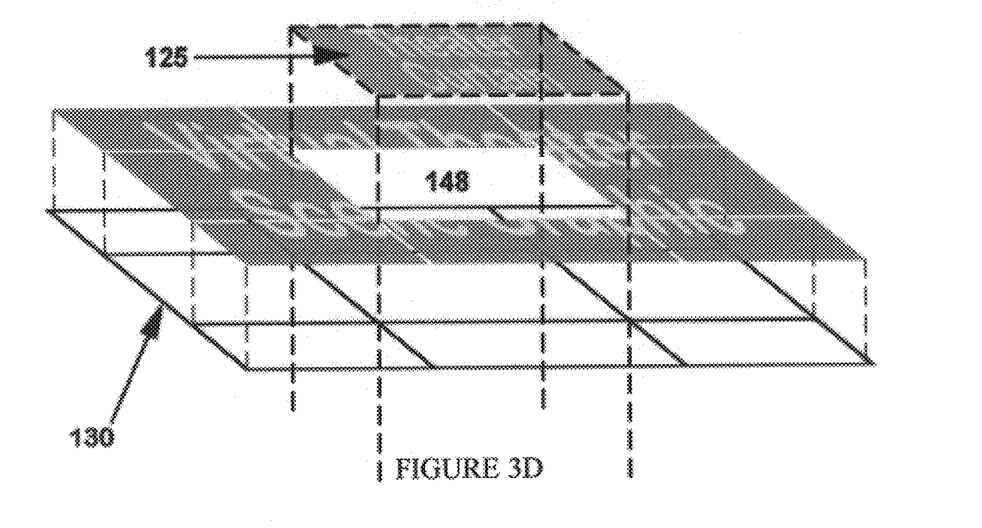

Selecting the template in Layer 2 in the Layers Window (not the graphic), four Guides 120 were used to delineate the borders of the template. The Guides were dragged in to border the stage curtain's graphic from PhotoShop's desktop ruler edges: two Guides were dragged in from the top and two from the left (FIG. 3c). The two Guides from the top were snapped to the top and bottom edges of Layer 2's 240 pw×176 ph white rectangle graphic 110, while the two Guides from the left were snapped to the left and right edges of Layer 2's 240 pw×176 ph white rectangle graphic 110. This created a nine-section 3×3 segmentation array with the Guides marking each segment's border 130 (FIG. 3d).

Figure 3E:
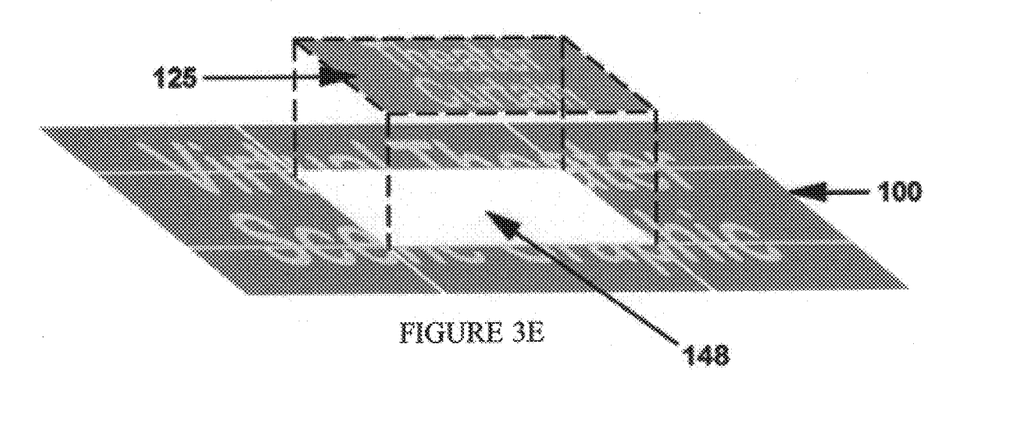

The newly-placed 240 pw×176 ph white rectangle graphic 110 was then selected using the square selection marquee. With the white rectangle graphic selection still active, the Virtual Theater Scene's Layer 1 was then selected in the Layers Window. This allowed for the 240 pw×176 ph white rectangle graphic's shape to be used as a copy/cut template for the stage curtain graphic. After selecting the Virtual Theater Scene's Layer 1 in PhotoShop's Layers Window, an Edit/Cut command was executed to cut a 240 pw×176 ph stage curtain segment out of the Virtual Theater Scene on Layer 1 (see FIG. 3d), leaving a "curtain hole" 148 in Layer 1 at the center of the stage. Layer 2 (the layer with the 240 pw×176 ph white rectangle graphic) was then selected in PhotoShop's Layers Window (not the Layer 2 graphic), followed by an Edit/Paste command which added the newly cut 240 pw×176 ph stage curtain segment 125 into a new upper-most Layer 3. The new 240 pw×176 ph stage curtain layer was then copied and pasted into its own file and saved as curtain240.jpg. Layer 2 (the layer with the 240 pw×176 ph white rectangle graphic 110) was then deleted producing a two-layer graphics file: Layer 1 contained the Virtual Theater Scene 100 with a 240 pw×176 ph rectangular "curtain hole" 148 cut out at its center, and Layer 2 contained the 240 pw×176 ph stage curtain segment 125 cut from Layer 1's Virtual Theater Scene (see FIG. 3e). The file was then saved as mh_theatre.psd. An illustration of a specific embodiment of the Virtual Theater's mh_theater.psd file is shown in FIG. 3ee.

A variation of this process has been found to be an effective method of custom watermarking PhotoShop artwork.

Steps To Segmenting the Virtual Theater Scene's Curtain

Step 1: The Presentation File dimensions were chosen: 240 pixels wide×176 pixels high.

Step 2: The complete Virtual Theater scene design 100 (poster art) was created. (FIG. 3a)

Step 3: A new 240 pw×176 ph rectangle graphic 110 was created to simulate the video window size.

Step 4: The new 240 pw×176 ph rectangle graphic 110 was pasted into the complete Virtual Theater scene design in the layer above the Virtual Theater scene's layer, and positioned so as to be in the desired center stage location. (FIG. 3b).

Step 5: The 240 pw×176 ph white rectangle graphic's shape was used as a cutting template for the stage curtain graphic. The new 240 pw×176 ph rectangle graphic was carefully selected using the box selection tool so as not to be repositioned.

Step 6: Four Guides were dragged in from PhotoShop's desktop ruler edges to border the 240 pw×176 ph white rectangle graphic 110 (FIG. 3c)

1 guide was dragged from the top ruler and snapped to the top edge of the 240 pw×176 ph white rectangle graphic, 1 guide was dragged from the top ruler and snapped to the bottom edge of the 240 pw×176 ph white rectangle graphic, 1 guide was dragged from the left ruler and snapped to the left edge of the 240 pw×176 ph white rectangle graphic, 1 guide was dragged from the left ruler and snapped to the right edge of the 240 pw×176 ph white rectangle graphic.

Step 7: With the white rectangle graphic selection in Layer 2 still active, the Virtual Theater scene graphic's Layer 1 was then selected in PhotoShop's Layers Window.

Step 8: An Edit/Cut command was executed to cut a 240 pw×176 ph section out of the Virtual Theater scene graphic on Layer 1. (FIG. 3d).

Step 9: The white rectangle graphic's Layer 2 was then selected in the Layers Window, followed by an Edit/Paste command. This step added the new 240 pw×176 ph stage curtain section which was cut from the Virtual Theater scene graphic in Step 9 into a new Layer 3.

Step 10: The white rectangle graphic's Layer 2 was then deleted.

Step 11: The new 240 pw×176 ph stage curtain layer was then copied and pasted into its own file, flattened and saved as curtain240.jpg Step 12: With the Virtual Theater scene graphic on Layer 1 and the 240 pw×176 ph stage curtain 125 graphic segment on Layer 2, the file was saved as mh_theatre.psd. (FIG. 3e)

Segmenting The Virtual Theater Scene

The next step was to crop the final mh_theatre.psd Virtual Theater scene "poster" graphic's segments into individual Virtual Theater graphics segments. The simplest approach was to slice mh_theatre.psd into four parts: top ⅓rd segment 140, center left segment 145, center right segment 150 and bottom ⅓rd segment 150. The absolute center/middle segment 148 was reserved for the Presentation File on the web page, and was sized for conformance with the layer 2 curtain graphic (see FIG. 3f).

Figure 3F:
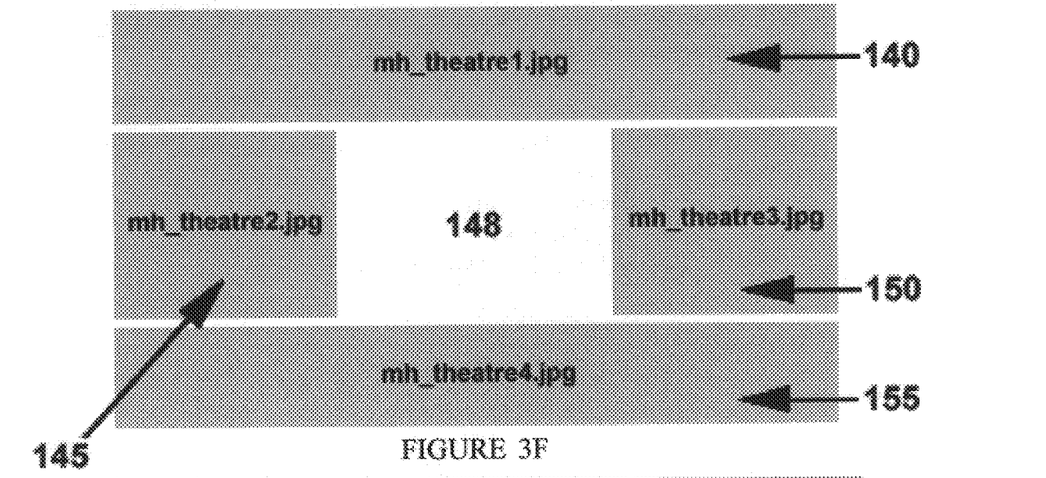

With the new stage curtain's layer 2 selected in PhotoShop's Layers Window, guides were dragged in to border the stage curtain's graphic on all four sides. Using the square selection marquee from PhotoShop's toolbox and the Guides' intersections as sizing templates, the top three segments were cropped and saved as mh_theatre1.jpg 140, the left middle segment was cropped and saved as mh_theatre2.jpg 145, the right middle segment was cropped and saved as mh_theatre3.jpg 150, and the bottom three segments were cropped and saved as mh_theatre4.jpg 155. An example of a standard naming convention for the segment's files follows the style mh_theatre N.jpg. The Virtual Theater Scene segments, plus a Theater Curtain segment if all laid out together would re-create the original Virtual Theater design.

Segment files may also be saved as indexed .gifs; however, JPEG graphics file formats are preferred because they appear less grainy. The use of either .gif or JPEG files as discussed herein are application and target bandwidth dependent.

Figure 4:
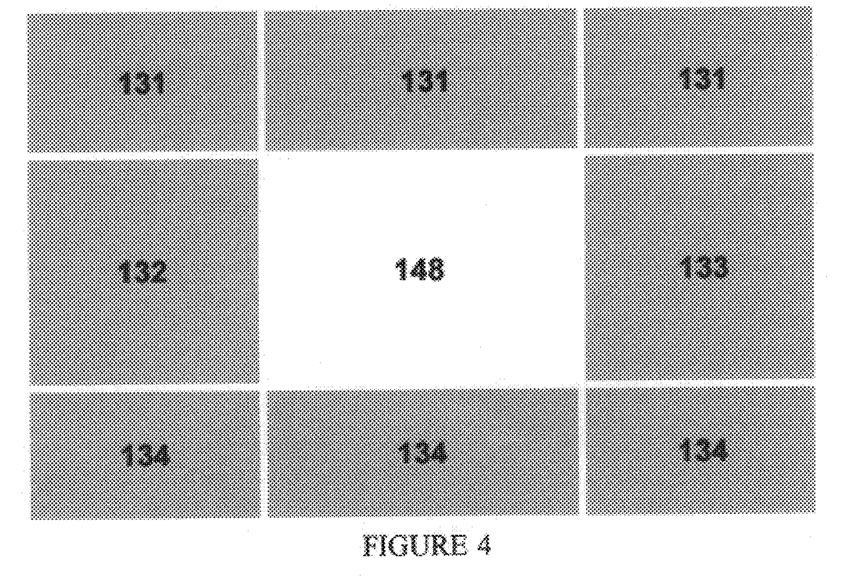
FIG. 4 shows one embodiment of a scene segmentation profile.

Numerous scene segmentation variations are also possible. FIG. 4 illustrates the original segmentation pattern prior to cropping the top three segments into mh_theatre1.jpg and the bottom three segments into mh_theatre 4.jpg. These segments could be segmented even further for added non-image-mapped hypertext linking from the segment's graphic, rollover graphics, and advertising banners for MTMC Embedding into a web page design. In addition, the presentation file's window may be located anywhere within the scene and does not have to be located in the center of the scene. The flexibility within this process to have different combinations of custom presentation files and custom scene dimension sizes make a large number of Virtual Theater designs possible.

Steps To Segmenting the Virtual Theater Scene

The next step was to crop the final mh_theatre.psd Virtual Theater scene "poster" graphic's segments into individual Virtual Theater graphics segments. The simplest approach was to slice mh_theatre.psd into four parts: top ⅓rd, center left, center right and bottom ⅓rd. The absolute center/middle segment (where the rectangular hole is) would be reserved for the Presentation File on the web page.

Step 1: Using the square selection marquee from Photo-Shop's toolbox and the Guides' intersections as sizing templates, the top three segments 131 were cropped and saved as mh_theatre1.jpg 140.

Step 2: Using the square selection marquee from Photo-Shop's toolbox and the Guides' intersections as sizing templates, the left middle segment 132 was cropped and saved as mh_theatre2.jpg 145.

Step 3: Using the square selection marquee from Photo-Shop's toolbox and the Guides' intersections as sizing templates, the right middle segment 133 was cropped and saved as mh_theatre3.jpg 150.

Step 4: Using the square selection marquee from Photo-Shop's toolbox and the Guides' intersections as sizing templates the bottom three segments 134 were cropped and saved as mh_theatre4.jpg 155.

The Presentation File

The Virtual Theater example discussed herein had stage curtains which opened when the show started and closed when the show concluded. In order to include opening and closing curtains into the Virtual Theater, one must either incorporate the drawing curtain effect into a stand-alone animation file and synchronize that file with the Presentation File in the web page's time line, or the drawing curtain effect must be incorporated directly into the Presentation File.

Drawing Curtains as a Stand-alone Animation File

Animating the curtain drawing effect and placing it in a separate DHTML or XML layer on the web page above the Presentation File creates certain problems with the current available technology. For instance, the animation file would need to possess a transparent background for the Presentation File below it to be seen. Furthermore, the timing of the two files must be exact with the animation file having been completely loaded and ready to play at the precise moment the Presentation File begins playing, and the animation file must complete playing at the precise moment the Presentation File completes playing. The curtain animation file's loop function would also have to be disabled (LOOP="0").

There is currently no system for a developer to program a DHTML, XML or JAVA time line so as to compensate for the download caching and start times of multiple asynchronous multimedia files. This is particularly problematic if any of the considered multimedia files is to be streamed for viewing. Add to this the fact that a developer must also factor in variables for the multitude of end-user bandwidth combinations which directly affects file download times, and it becomes clear that the "drawing curtains effect" must somehow be physically incorporated into the Presentation File.

Drawing Curtains Incorporated Directly into the Presentation File

Thus, the "drawing curtain effect" is directly incorporated into the Presentation File such that the playback of the "drawing curtain effect" is synchronous with the playing of the presentation file. The incorporation of the drawing curtain effect into the Presentation File occurs during post production of the Presentation File.

A preferred method for incorporating the drawing curtain effect into the Presentation File is to import curtain240.jpg (which was saved to its own file at the conclusion of the original Scene Design) directly into the Presentation File during video post production. With the professional use of any video post production editing system, this post-production process guarantees synchronization between the opening and closing of the stage curtains and the start time, end time and play duration of the Presentation File.

Start of the Presentation File

A list of the basic steps required to achieve the production of a Virtual Theater Presentation File with the "drawing curtains effect" incorporated within is set out below.

Step 1: Open the video project file in a NLE.

Step 2: Ensure the beginning of the first media clip in the time line has its start time aligned with 0 seconds on the time line.

Step 3: Import the curtain240.jpg file and place it on a $2^{nd}$ layer with its start time also aligned with 0 seconds on the time line.

Step 4: Stretch curtain240.jpg for a duration of 3 seconds.

Step 5: Create (or load in cases where the NLE has one available) a "barn door" or "sliding door" transition effect.

Step 6: Set the barn door effect's duration for 3 seconds, and place it between curtain240.jpg and the start of the first media clip in the time line.

Step 7: Align the barn door transition's start time with 0 seconds on the time line. This creates a 3-second time frame (starting at time 0 seconds and ending at time 3 seconds) where the start of the media clip, the barn door transition effect and curtain240.jpg can all be superimposed.

Step 8: Configure the barn door effect to transition from curtain240.jpg to the media clip End of the Presentation File Step 1: Find the end of the last media clip in the time line.

Step 2: Import the curtain240.jpg file once again and place it on a $2^{nd}$ layer.

Step 3: Stretch curtain240.jpg for a duration of 3 seconds.

Step 4: Align the end of curtain240.jpg with the end of the last media clip in the time line.

Step 5: Create (or load in cases where the NLE has one available) a "barn door" or "sliding door" transition effect.

Step 6: Set the barn door effect's duration for 3 seconds, and place it between curtain240.jpg and the end of the last media clip in the time line.

Step 7: Align the barn door transition's stop time with the end of the end of curtain240.jpg and the last media clip in the time line. This creates a 3-second time frame (starting at 3 seconds before the end of the last media clip and ending at the end of the media clip) where the end of the media clip, the barn door transition effect and curtain240.jpg can all be superimposed.

Step 8: Configure the barn door effect to transition from the media clip to curtain240.jpg.

Step 9: Save the project file, and final output the project to the desired video file format.

Playback of the final output video file (i.e. the Presentation File) yields the curtains opening to start the video (curtain240.jpg transitioning to the media clip via the barn door transition effect) and the curtains closing at the end of the video (the media clip transitioning to curtain240.jpg via the barn door transition effect). Because curtain240.jpg was physically cut from the exact same Virtual Theater scene graphic used for the Virtual Theater web design, the video Presentation File (even though in reality it is its own separate and unique compilation) physically becomes an integral segment of the final segmented Virtual Theater Scene. During post production of the Presentation File, Ulead Systems' MediaStudio Pro 5.0 Non-Linear Editor (NLE) software is used to save the video in Ulead System's own proprietary .dvp (DigitalVideoProject) format. Once the video file is saved as a .dvp file, MediaStudio Pro can be used to create (i.e. be saved as) video files in various producer-selectable file formats. A preferred step in the process was to save the video file output in Microsoft's Video for Windows .avi file format, which not only enables viewability of the final video file from within Windows, but it also allows the importation of the video file into a streaming media development program for streamed viewing over the World Wide Web.

Virtual Theater Architecture

All of the component files, e.g. mh_theatre1.jpg, mh_theatre2.jpg, mh_theatre3.jpg, mh_theatre4.jpg and the presentation file, were pieced together in HTML. This required a unique use (and abuse) of the HTML TABLE tag. Critical to the Virtual Theater architecture is the "to a pixel" accuracy in table cell horizontal (and vertical in some table configurations) dimensioning to match the horizontal dimensions of the scene segments, as well as the complete elimination of any non-breaking spaces and white spaces in all table cells.

MultiTable/MultiCell Embedding (MTMC Embedding)

Multi-row and/or multi-column tables are used for the Virtual Theater architecture, where each table's cell is assigned, and dimensioned to, a segmented scene or select group of segmented scenes placed within their own sub-table. By embedding multiple tables within multiple table cells, in combination with pixel-accurate table and cell size attributes, a variety of innovative Virtual Theater motifs can be achieved.

There are numerous architectures that can utilize the MTMC Embedding process. A detailed description of several examples of the MTMC Embedding process and their respective architectures are given below in HTML source code. Please note that the following source code sections are "copy and paste" ready except for the scene segments, whose attributes, file paths and properties were deleted. Copying the following source code sections into an HTML editor will yield full table layouts with each scene segment's name in the appropriate main table's or sub-table's cell.

Figure 5A:
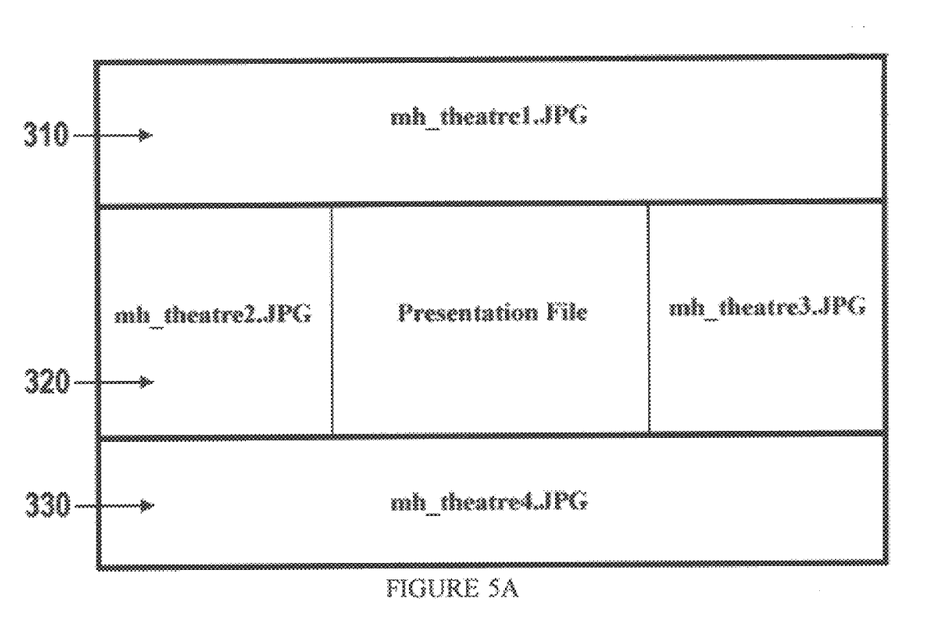

1. Tables 310, 320, and 330 (one for each of the three rows as illustrated in FIG. 5*a*) are created for combining scene segments and then laid out on top of each other. Because the tables are floating and have nothing to "glue" them together in code, this method can be problematic as spaces between tables and/or mis-alignment between tables can occur when viewed on the Web, especially in older browsers.

```
<table border="0" width="600" height="111" cellspacing="0" cellpadding="0">
  <tr>
    <td width="600" height="111" align="CENTER" valign="MIDDLE">mh_theatre1.jpg</td>
  </tr>
</table>
<table border="0" width="600" cellspacing="0" cellpadding="0">
  <tr>
    <td width="180" height="176" align="CENTER" valign="MIDDLE">mh_theatre2.jpg</td>
    <td width="240" height="176" align="CENTER" valign="MIDDLE">PRESENTATION FILE</td>
    <td width="180" height="176" align="CENTER" valign="MIDDLE">mh_theatre3.jpg</td>
  </tr>
</table>
<table border="0" width="600" height="100" cellspacing="0" cellpadding="0">
  <tr>
    <td width="600" height="100" align="CENTER" valign="MIDDLE">mh_theatre4.jpg</td>
  </tr>
</table>
```

Figure 5B:
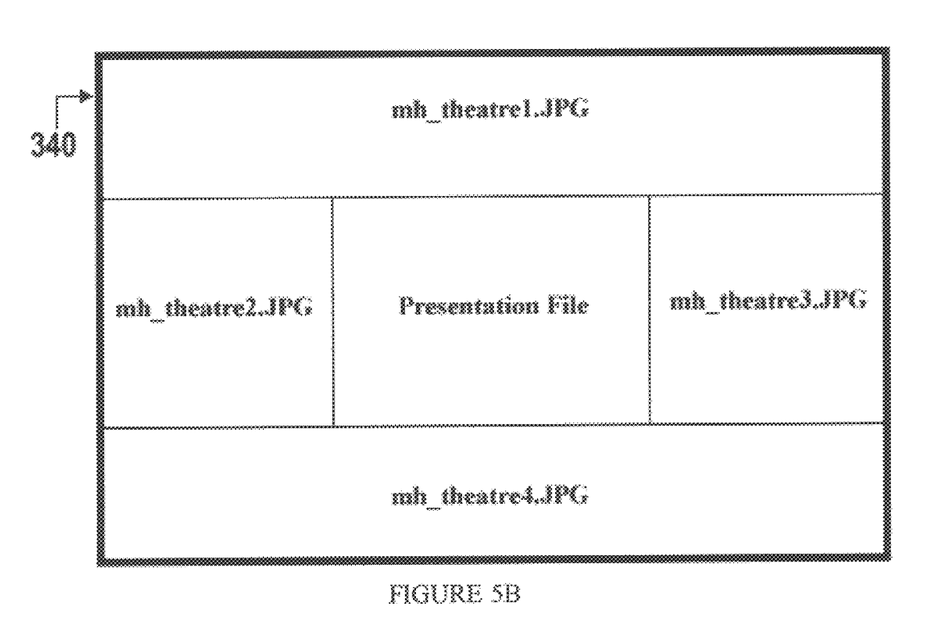

2. Three separate tables can be created (one for each of the three rows as illustrated in FIG. 5*a*) for combining scene segments, a fourth 1 row×1 column table 340 was also created and was used to encapsulate all three embedded tables to maintain vertical alignment. FIG. 5*b* illustrates the HTML table layout with borders=1 for the encapsulation table to distinguish it from the three embedded tables.

```
<table border="0" width="600" height="387" cellspacing="0" cellpadding="0">
  <tr>
    <td width="600" height="387" align="CENTER" valign="MIDDLE">
      <table border="0" width="600" height="111" cellspacing="0" cellpadding="0">
      </tr>
        <td width="600" height="111" align="CENTER" valign="MIDDLE">mh_theatre1.JPG</td>
      </tr>
      </table>
      <table border="0" width="600" cellspacing="0" cellpadding="0">
        <tr>
          <td width="180" height="176" align="CENTER" valign="MIDDLE">mh_theatre2.JPG</td>
          <td width="240" height="176" align="CENTER" valign="MIDDLE">PRESENTATION FILE</td>
          <td width="180" height="176" align="CENTER" valign="MIDDLE">mh_theatre3.JPG</td>
        </tr>
```

-continued

```
    </table>
    <table border="0" width="600" height="100" cellspacing="0" cellpadding="0">
     <tr>
      <td width="600" height="100" align="CENTER" valign="MIDDLE">mh_theatre4.JPG</td>
     </tr>
    </table>
   </td>
  </tr>
</table>
```

Figure 5C:
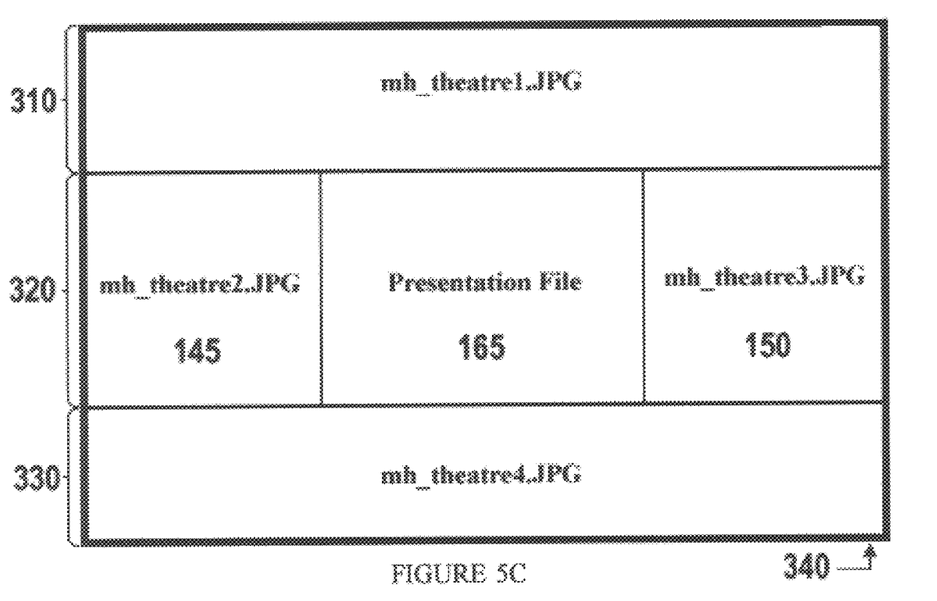

3. A 3 row×1 column main table 340 is created, plus a 1 row×3 column sub-table 320 is created. From left to right, scene segment mh_theatre2.JPG 145, the Presentation File 165, and scene segment mh_theatre3.JPG 150 would be embedded in the sub-table's cells. This 1×3 sub-table 320 is embedded in the middle row of the 3×1 main table 340. FIG. 5c illustrates the HTML table layout with borders=1 for the sub-table to distinguish it from the main table.

Figure 5D:
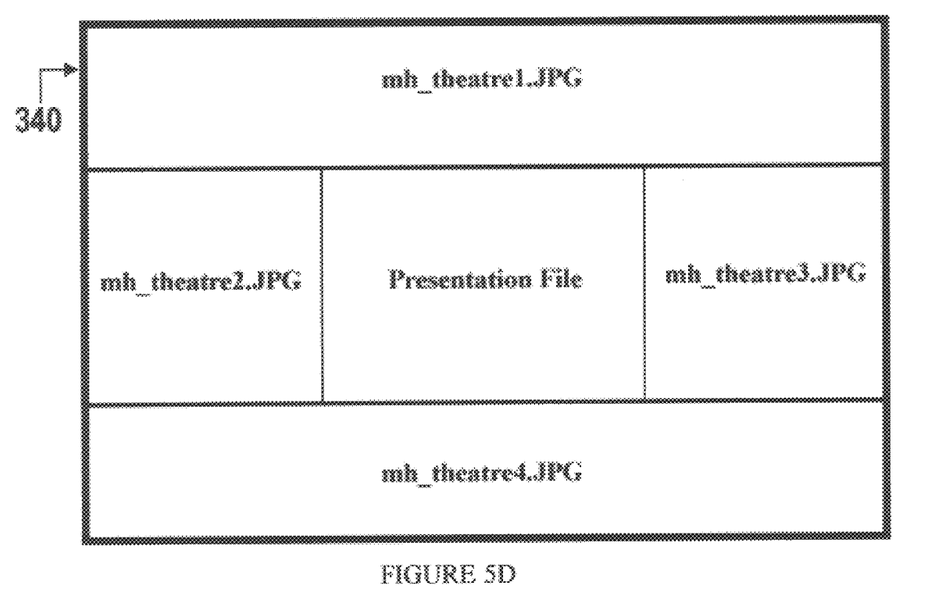
Figure 5E:
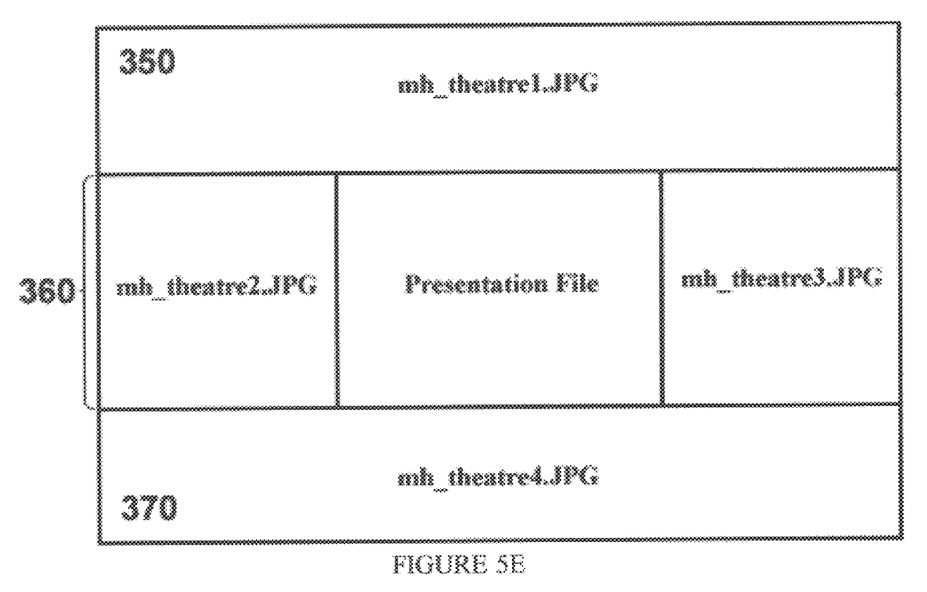

4. Three separate tables 310, 320, and 330 (one for each of the three rows as illustrated in FIG. 5a) are created. A fourth 3 row×1 column main table 340 is also created which is used to encapsulate tables 310, 320, and 330 individually for combining scene segments. FIG. 5d illustrates the HTML table layout with borders=1 for the 3×1 main table 340 to distinguish it from the three embedded tables.

```
<table border="0" width="600" height="387" cellspacing="0" cellpadding="0">
 <tr>
  <td width="600" height="111" align="CENTER" valign="MIDDLE">mh_theatre1.JPG</td>
 </tr>
 <tr>
  <td width="600" height="176" align="CENTER" valign="MIDDLE">
   <table border="0" width="600" height="176" cellspacing="0" cellpadding="0">
    <tr>
     <td width="180" height="176" align="CENTER" valign="MIDDLE">mh_theatre2.JPG</td>
     <td width="240" height="176" align="CENTER" valign="MIDDLE">PRESENTATION FILE</td>
     <td width="180" height="176" align="CENTER" valign="MIDDLE">mh_theatre3.JPG</td>
    </tr>
   </table>
  </td>
 </tr>
 <tr>
  <td width="600" height="100" align="CENTER" valign="MIDDLE">mh_theatre4.JPG</td>
 </tr>
</table>
```

```
<table border="0" width="600" cellspacing="0" cellpadding="0">
 <tr>
  <td align="CENTER" valign="MIDDLE" width="600" height="111">mh_theatre1.JPG</td>
 </tr>
 <tr>
  <td align="CENTER" valign="MIDDLE" width="600" height="176">
   <table border="0" width="600" cellspacing="0" cellpadding="0">
    <tr>
     <td width="180" height="176" align="CENTER" valign="MIDDLE">mh_theatre2.JPG</td>
     <td width="240" height="176" align="CENTER" valign="MIDDLE">PRESENTATION FILE</td>
     <td width="180" height="176" align="CENTER" valign="MIDDLE">mh_theatre3.JPG</td>
    </tr>
   </table>
  </td>
 </tr>
 <tr>
  <td align="CENTER" valign="MIDDLE" width="600" height="100">
   <table border="0" width="600" height="100" cellspacing="0" cellpadding="0">
    <tr>
     <td width="600" height="100" align="CENTER" valign="MIDDLE">
      <table border="0" width="600" height="111" cellspacing="0" cellpadding="0">
       <tr>
        <td width="600" height="111" align="CENTER" valign="MIDDLE">mh theatre4.JPG</td>
       </tr>
```

-continued

```
      </table>
     </td>
    </tr>
   </table>
  </td>
 </tr>
</table>
```

Figure 5F:
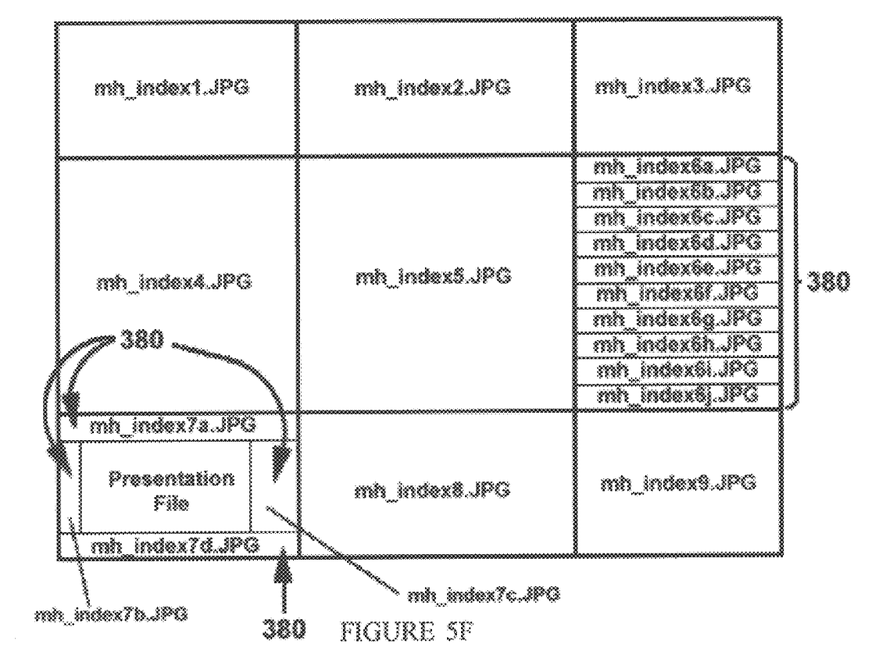

5. A single 3-row×3-column table can be created to match the configuration of the scene segments. The table's top 3-column row and bottom 3-column row were each merged into single column span using the HTML COLUMNSPAN attribute. This created a 3-row table with 1 column in the top row 350, 3 columns in the middle row 360, and 1 column in the bottom row 370 (see FIG. 5e.) Each cell was then individually dimensioned in HTML source code to match the dimensions of its mating mh_theatreN.jpg scene segment.

example illustrated in FIG. 5f shows a 3 row×3 column main table, with sub-tables 380 embedded in the middle-right cell and the lower-left cell. The sub-table embedded in the middle-right cell is a menu panel with JAVAscript roll-over button capabilities, where the buttons are menu-labeled scene segments. The sub-table embedded in the lower-left cell is a miniature of variation 5 above which has its own scene segmented from the original poster design and segmented to fit into its own embedded sub-table. Both sub-

```
<table border="0" width="600" height="387" cellspacing="0" cellpadding="0">
  <tr>
    <td width="600" height="111" align="CENTER" valign="MIDDLE" colspan="3">mh_theatre1.JPG</td>
  </tr>
  <tr>
    <td width="180" height="176" align="CENTER" valign="MIDDLE">mh_theatre2.JPG</td>
    <td width="240" height="176" align="CENTER" valign="MIDDLE">PRESENTATION FILE</td>
    <td width="180" height="176" align="CENTER" valign="MIDDLE">mh_theatre3.JPG</td>
  </tr>
  <tr>
    <td width="600" height="100" align="CENTER" valign="MIDDLE" colspan="3">mh_theatre4.JPG</td>
  </tr>
</table>
```

6. A multi-row/multi-column main table can be created and embedded with multiple sub-tables to match the configuration of the scene segments and presentation files. One tables are enclosed in a dot-lined box in the source code below, and have their border attributes set to "1" in FIG. 5f so they could be visible in the layout.

```
<table border="0" width="600" cellspacing="0" cellpadding="0" align="CENTER">
  <tr>
    <td width="200" align="CENTER" valign="MIDDLE">mh_index1.JPG</td>
    <td width="228" align="CENTER" valign="MIDDLE">mh_index2.JPG</td>
    <td width="172" align="CENTER" valign="MIDDLE">mh_index3.JPG</td>
  </tr>
  <tr>
    <td width="200" align="CENTER" valign="MIDDLE">mh_index4.JPG</td>
    <td width="228" align="CENTER" valign="MIDDLE">mh_index5.JPG</td>
    <td width="172" align="CENTER" valign="MIDDLE">
      <table border="0" width="172" cellspacing="0" cellpadding="0">
        <tr><td width="172" align="CENTER" valign="MIDDLE">mh_index6a.JPG</td></tr>
        <tr><td width="172" align="CENTER" valign="MIDDLE">mh_index6b.JPG</td></tr>
        <tr><td width="172" align="CENTER" valign="MIDDLE">mh_index6c.JPG</td></tr>
        <tr><td width="172" align="CENTER" valign="MIDDLE">mh_index6d.JPG</td></tr>
        <tr><td width="172" align="CENTER" valign="MIDDLE">mh_index6e.JPG</td></tr>
        <tr><td width="172" align="CENTER" valign="MIDDLE">mh_index6f.JPG</td></tr>
        <tr><td width="172" align="CENTER" valign="MIDDLE">mh_index6g.JPG</td></tr>
        <tr><td width="172" align="CENTER" valign="MIDDLE">mh_index6h.JPG</td></tr>
        <tr><td width="172" align="CENTER" valign="MIDDLE">mh_index6i.JPG</td></tr>
        <tr><td width="172" align="CENTER" valign="MIDDLE">mh_index6j.JPG</td></tr>
      </table>
    </td>
  </tr>
  <tr>
    <td width="200" align="CENTER" valign="MIDDLE">
```

```
<table border="0" width="200" cellspacing="0" cellpadding="0">
  <tr><td width="200" colspan="3" align="CENTER" valign="MIDDLE">mh_index7a.JPG</td></tr>
  <tr><td width="15" align="CENTER" valign="MIDDLE">mh_index7b.JPG</td>
    <td width="145" align="CENTER" valign="MIDDLE">PRESENTATION FILE</td>
    <td width="40" align="CENTER" valign="MIDDLE">mh_index7c.JPG</td>
  </tr>
  <tr>
    <td width="200" colspan="3" align="CENTER" valign="MIDDLE">mh_index7d.JPG</td>
  </tr>
  </table>
 </td>
 <td width="228" align="CENTER" valign="MIDDLE">mh_index8.JPG</td>
 <td width="172" align="CENTER" valign="MIDDLE">mh_index9.JPG</td>
 </tr>
</table>
```

Figure 5G:
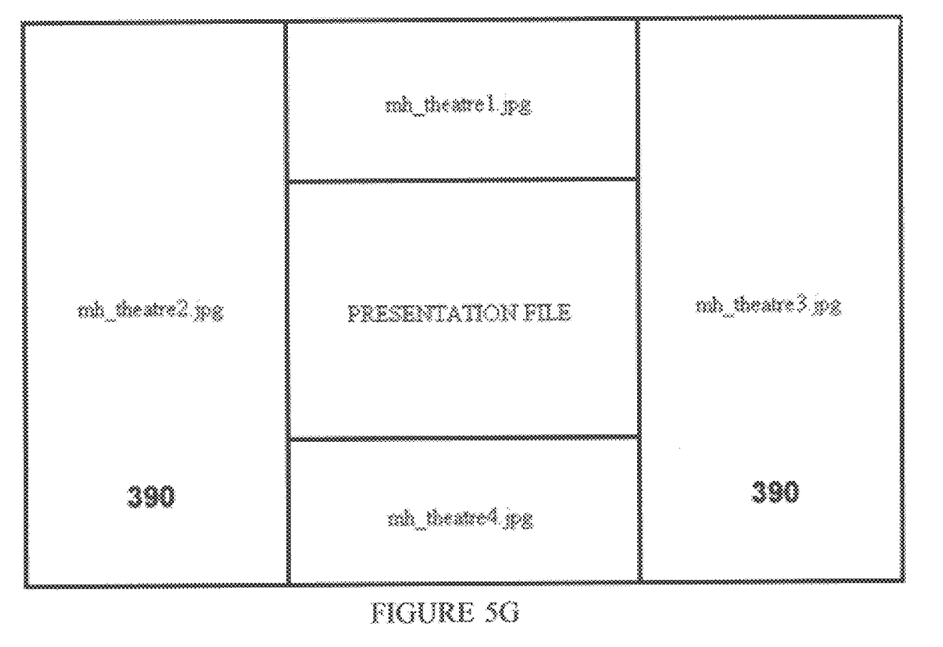
Figure 5H:
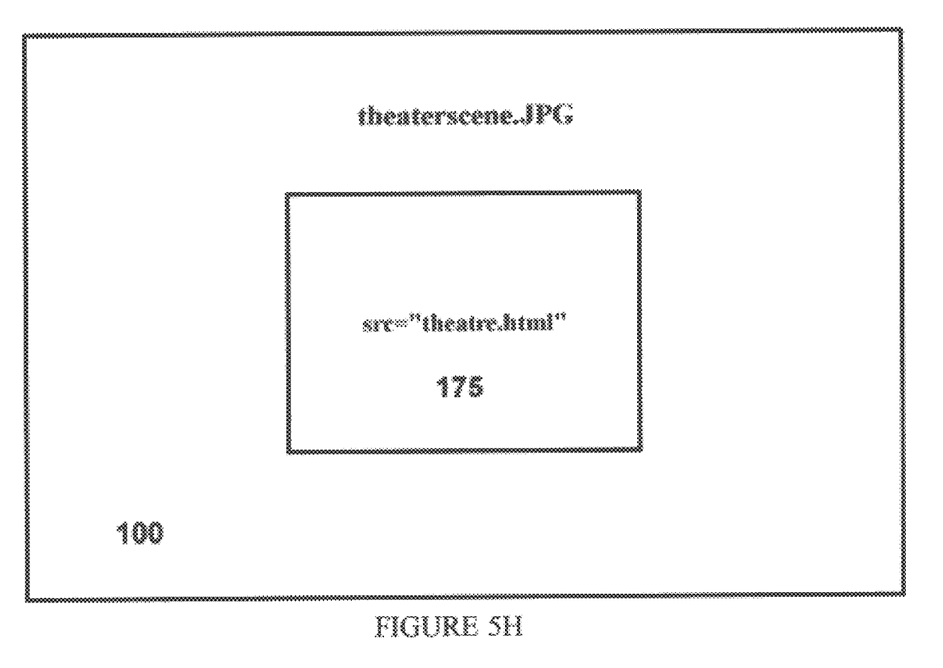

7. A single 3-row/3-column table can be created to match the configuration of the scene segments. But instead of having an upper and lower row spanning multiple columns, this architecture can have left and right columns 390 spanning multiple rows (FIG. 5g.) All of the previous MultiTable/MultiCell Embedding processes apply, and scene segments mh_theatre2.jpg and mh_theatre2.jpg would of course need to be designed for a more vertical layout topography.

resides in a layer above the base layer and is positioned using position coordinates. It is recommended that the upper-layer presentation file's coordinates are referenced to the page's X and Y as opposed to the page's corners. Also, in DHTML a presentation file which is placed on an upper layer must physically reside in a separate file on a separate web page. The DHTML layer's source will point to the presentation file's page and port it through the scene. Also, the source presentation file must be placed at the upper-left most position of its page with no non-breaking spaces or white spaces, otherwise mis-alignment with the Virtual

```
<table border="0" width="600" cellspacing="0" cellpadding="0">
 <tr>
   <td width="180" height="387" align="CENTER" valign="MIDDLE" rowspan="3">mh_theatre2.jpg</td>
   <td width="240" height="111" align="CENTER" valign="MIDDLE">mh_theatre1.jpg</td>
   <td width="180" height="387" align="CENTER" valign="MIDDLE" rowspan="3">mh_theatre3.jpg</td>
 </tr>
 <tr>
   <td width="240" height="176" align="CENTER" valign="MIDDLE">PRESENTATION FILE</td>
 </tr>
 <tr>
   <td width="240" height="100" align="CENTER" valign="MIDDLE">mh_theatre4.jpg</td>
 </tr>
</table>
```

8. For a DHTML Virtual Theater (FIG. 5h), any combination of HTML MultiTable/MultiCell Embedding can be used for the scene. In DHTML, the Presentation File 175 Theater scene may occur. In the example below, the Virtual Theater scene uses the entire poster design placed as a one-piece (and rather large) graphic.

```
<table border="0" width="600" cellspacing="0" cellpadding="0">
   <tr>
     <td width="600" align="CENTER" valign="MIDDLE">theaterscene.JPG</td>
   </tr>
  </table>
  <layer id="PresentationFile" width="160" height="120" z-index="1" src="theatre.html" visibility="SHOW" pagex="231" pagey="171">
  </layer>
```

Dimensioning a table cell's height is not critical in a simple Segmented Scene application with the newer (NSC or IE version 3.0 or later) browsers, as long as all of the participating scene segments possess identical height dimensions. The exception to this is when the COLUMNSPAN and/or ROWSPAN attributes are modified to customize a table's cell array where cell height and width dimensions are a necessity. Also critical to a seamless Segmented Scene is the complete elimination of non-breaking spaces and white spaces within MultiTable/MultiCell Embedded tables and table cells, as are "0" settings for table border, cellspacing and cellpadding attributes.

While preferred embodiments of the invention have been shown and described, it will be apparent to those skilled in the art that the conception and the specific embodiments disclosed may be readiliy utilized as a basis for modifying or designing other systems and processes for carrying out the same purpose as the present invention. It should be realized by those skilled in the art that such equivalent constructions do not depart from the spirit and scope of the invention as set forth in the appended claims.

DEFINITIONS

Virtual Theater: Title encompassing the whole of the Virtual Theater Motifs, Virtual Theater Design, Virtual Theater Design Architecture, Virtual Theater Design Processes and Virtual Theater Components which produces and presents a complete scene or scenes from within which presentation files are viewed, played, downloaded and/or streamed.

Virtual Theater Motifs: The branded presentations to end-users of a complete scene or scenes, resultant from and as produced by using the Virtual Theater Design Architecture and the Virtual Theater Design Processes, from within which presentation files are viewed, played, downloaded and/or streamed.

Virtual Theater Design: The end product consisting of a complete scene or scenes, resultant from and as produced by using the Virtual Theater Design Architecture and the Virtual Theater Design Processes, from within which presentation files are viewed, played, downloaded and/or streamed.

Virtual Theater Design Architecture: Methods of combining Virtual Theater Component outputs from the Virtual Theater Design Processes to create, modify and lay out the Virtual Theater scene or scenes through which presentation files are viewed, played, downloaded and/or streamed.

Virtual Theater Design Processes: Processes for creating, modifying and preparing Virtual Theater Components to create a scene or scenes through which presentation files are viewed, played, downloaded and/or streamed.

Virtual Theater Components: Items created during the Virtual Theater Design Processes which when combined using Virtual Theater Design Architecture, comprises the core Virtual Theater Design. Virtual Theater Components can include static graphics files (in whole and/or in part when and/or segmented/cropped), animated graphics files (in whole and/or in part when segmented/cropped), multimedia/video files (in whole and/or in part when spliced or segmented/cropped) or merely a color.

Presentation Files: The "centerpiece of attention files" which are viewed, played, downloaded and/or streamed from within or through the Virtual Theater scene or scenes; which includes but is not limited to: motion picture video, graphics animations or video animations.

Although the invention has been described with reference to a specific embodiments, these descriptions are not meant to be construed in a limiting sense. Various modifications of the disclosed embodiments, as well as alternative embodiments of the invention will become apparent to persons skilled in the art upon reference to the description of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore, contemplated that the claims will cover any such modifications or embodiments that fall within the true scope of the invention.

What is claimed:

1. A system for integrating a presentation file into a computer environment comprising the steps of:

designing a background;

determining the dimensions and placement of the presentation file in the background;

creating a template to the dimensions of the presentation file;

copying and pasting the presentation file template into a layer above the background and in the desired position of the presentation file;

delineating the borders of the template with guides;

cutting out of the background a section of the background corresponding to the superimposed template's size and dimensions;

pasting the section into a new layer above the template;

deleting the template; copying and saving the section to its own file;

saving the background and the section to a scene-file, the background being on a bottom layer and the section on a layer above the background and superimposed over the desired location of the presentation file in the background;

segmenting the background;

saving each segment, including the empty segment corresponding to the section that was cut out, as a separate file;

creating a table and subtable of such files as necessary;

setting each table's and subtable's attributes to the exact dimensions of its respective segment file, the presentation file's dimensions being the same as that of the cut out section; and embedding each segment file and the presentation file in its designated table or subtable with pixel-accurate alignment.

* * * * *